(12) United States Patent
Paquette et al.

(10) Patent No.: US 8,486,302 B2
(45) Date of Patent: Jul. 16, 2013

(54) PROCESS FOR MANUFACTURE OF GRAPHITE OXIDE WITH PURGE OF CHLORINE DIOXIDE

(75) Inventors: Michael S. Paquette, Midland, MI (US); Thomas D. Gregory, Midland, MI (US); Shu Tao Chen, Shanghai (CN)

(73) Assignee: Dow Global Technologies LLC

( * ) Notice: Subject to any disclaimer, the term of this patent is extended or adjusted under 35 U.S.C. 154(b) by 34 days.

(21) Appl. No.: 13/145,571

(22) PCT Filed: Jan. 19, 2010

(86) PCT No.: PCT/US2010/021367
§ 371 (c)(1),
(2), (4) Date: Jul. 21, 2011

(87) PCT Pub. No.: WO2010/085444
PCT Pub. Date: Jul. 29, 2010

(65) Prior Publication Data
US 2011/0274610 A1    Nov. 10, 2011

Related U.S. Application Data

(60) Provisional application No. 61/147,326, filed on Jan. 26, 2009.

(51) Int. Cl.
*C01B 31/04*    (2006.01)

(52) U.S. Cl.
USPC ............... 252/378 R; 423/415.1; 423/448

(58) Field of Classification Search
USPC .................... 423/415.1, 448; 252/378 R
See application file for complete search history.

(56) References Cited

U.S. PATENT DOCUMENTS 2,798,878 A      7/1957   Hummers
8,048,950 B2    11/2011   Prud'homme et al.
2011/0014111 A1*  1/2011   Leugers et al. ............ 423/415.1

OTHER PUBLICATIONS

Brodie et al.; "On the Atomic Weight of Graphite"; 1859; 249-259.
Hummers et al.; "Preparation of Graphitic Oxide"; 1958; 1339.
McAllister et al; "Single Sheet Functionalized Graphene by Oxidation and Thermal Expansion of Graphite"; Chemical Materials; 2007; 19; 4396-4404; American Chemical Society.
Horiuchi et al; "Carbon Nonofilm with a New Structure and Property"; Japanese Journal of Applied Physics; 2003; 42; 1073; The Smithsonian/NASA Astrophysics Data System.
Staudenmaier; Ber. Dtsch. Ges. 1898; 31, 1481.
Mack et al.; "Graphite Nanoplatelet Reinforcement of Electrospun Polyacrylonitrile Nanofibers"; Advanced Materials; 2005, 17, 1.
Fuzellier et al; "A New Variety of Graphite Nitrate"; Laboratory of Applied Mineral Chemistry; Materials Science and Engineering; 31; 1977; 91-94.

* cited by examiner

*Primary Examiner* — Stuart Hendrickson
*Assistant Examiner* — Richard M Rump

(57) ABSTRACT

The present invention relates to a process for preparing a graphite oxide while purging chlorine dioxide. The invention process employs starting materials comprising a sulfuric acid, a nitric acid, a chlorate salt, and a graphite and further employs an inert purge gas.

15 Claims, No Drawings

PROCESS FOR MANUFACTURE OF GRAPHITE OXIDE WITH PURGE OF CHLORINE DIOXIDE

CROSS REFERENCE TO RELATED APPLICATIONS

This is a §371 application of PCT International Patent Application Number PCT/US2010/021367 filed Jan. 19, 2010, and claims priority from provisional application Ser. No. 61/147,326 filed Jan. 26, 2009, each of which is incorporated herein by reference in its entirety.

The present invention relates to a process for preparing a graphite oxide while purging chlorine dioxide. The invention process employs starting materials comprising a sulfuric acid, a nitric acid, a chlorate salt, and a graphite and further employs a non-reactive purge gas.

BACKGROUND OF THE INVENTION

Graphite oxide is a class of an intercalated layered material that is prepared by oxidizing a graphite with an oxidizing agent such as, for example, a chlorate salt or a permanganate salt. Graphite oxides are especially useful as intermediates in the preparation of exfoliated graphites, including graphene. One method of preparing an exfoliated graphite is rapidly heating a graphite oxide to high temperatures as exemplified later herein.

Exfoliated graphite, also known as expanded graphite, generally is an exfoliated or partially delaminated graphite having a Brunauer-Emmett-Teller (BET) surface area greater than BET surface area of graphite but less than the BET theoretical surface area of a single graphene sheet (i.e., less than 2630 square meters per gram ($m^2/g$)). Conventional exfoliated graphite typically has a BET surface area of between about 15 $m^2/g$ to about 150 $m^2/g$, depending on average particle size. Exfoliated graphite is useful for a variety of applications including, for example, in the formation of composites such as polymer composites and the higher the BET surface area of the exfoliated graphite, the more useful it is in such composites.

One disadvantage of long-known chlorate salt-based graphite oxidation reaction processes is generation of hazardous chlorine dioxide ($ClO_2$) gas, which is believed to be associated with effective oxidation of the graphite to graphite oxide. But during the reaction, concentration of the $ClO_2$ gas often builds up in headspace of reaction vessels to explosive concentrations (i.e., 10% or higher, for example, 50%). To minimize such hazards, temperature of reaction mixtures in such processes is typically kept at about 0 degrees Celsius (° C.) to 5° C., but this temperature reduces solubility and reactivity of the chlorate salt and can also increase concentration of the chlorine dioxide gas in the headspace of the reaction vessel when the reaction mixtures are warmed or allowed to warm to a higher temperature (typically ambient, i.e., about 25° C.), after addition of the chlorate salt. There is a need in the art for a graphite oxidation process that eliminates this hazard without reducing quality of graphite oxide produced thereby.

BRIEF SUMMARY OF THE INVENTION

In a first embodiment, the present invention provides a process for preparing (e.g., manufacturing) a graphite oxide in a reaction vessel containing chlorine dioxide while purging chlorine dioxide from headspace of the reaction vessel. The process comprises steps of: (a) providing an adjustable-flow source of purge gas and a reaction vessel defining a purge gas inlet and a purged gas outlet, wherein the reaction vessel contains a headspace and a reaction mixture comprising the following starting materials: a sulfuric acid, a nitric acid, a first amount of a chlorate salt, and graphite, wherein the reaction mixture is in fluid communication with the headspace of the reaction vessel and the adjustable-flow source of purge gas is in sequential fluid communication with the purge gas inlet, headspace, and purged gas outlet of the reaction vessel; (b) allowing the reaction mixture to react, at a reaction running temperature and for a reaction running time, to form graphite oxide and chlorine dioxide gas, and some of the chlorine dioxide gas to migrate into the headspace; (c) purging with a purge gas at least some of the $ClO_2$ gas from the headspace and out of the reaction vessel via the purged gas outlet by sequentially flowing the purge gas at an adjustable flow rate from the adjustable-flow source of purge gas through the purge gas inlet, into the headspace of the reaction vessel, and out of the reaction vessel via the purged gas outlet; and (d) separating the graphite oxide from the reaction mixture to give an isolated graphite oxide.

DETAILED DESCRIPTION OF THE INVENTION

As used herein, "a," "an," "the," "at least one," and "one or more" are used interchangeably. In any embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

DEFINITIONS

The term "adjustable-flow source of purge gas" means a container of a purge gas (described later) fitted with any conventional mechanical device, i.e., a valve, for stopping, starting, and adjusting (i.e., regulating) a flow of purge gas from the container. Examples of the valved containers are a valved cylinder or tank suitable for holding pressurized purge gas. In some embodiments, the valved cylinder or tank is in fluid communication with the reaction vessel via a valved laboratory or plant purge gas line. The gas line (e.g., pipe, tube, and tubing) optionally may be fitted with one or more pressure regulators, backflow valves, traps, pressure-release valves, drying tubes, and other conventional mechanical devices suitable for use with a gas line.

The term "aqueous" and "aqueous solution of" when referring to a chemical compound (e.g., sodium chlorate) are synonymous and mean a solution comprising the chemical compound dissolved in water.

The terms "Brunauer-Emmett-Teller surface area" and "BET surface area" are synonymous and is measured using a method in which 30% nitrogen in helium, at a $P/P_0$ ratio of 0.3, adsorbed onto a test sample at liquid nitrogen temperature. In the method, use a Quantachrome Monosorb BET surface area analyzer (Quantachrome Instruments, Boynton Beach, Fla., USA) having a measurement position to make the measurements. Load a test sample (e.g., an exfoliated graphite such as highly exfoliated graphite and graphene) into a tared cuvette and degas the test sample for 10 minutes at 200° C. and atmospheric pressure. Place the cuvette in the measurement position of the analyzer and allow it to purge for 10 minutes. Allow nitrogen/helium gas to absorb at liquid nitrogen temperature and then desorb at room temperature to give desorption signals. Record signal readings in square meters ($m^2$). Remove sample from the analyzer and determine its final sample mass. Divide integrated desorption signal by the final sample mass to obtain the BET surface area in square meters per gram. Repeat with two additional test samples. Average the BET surface area of the 3 runs to determine the final BET surface area.

The term "chlorate salt" means an inorganic ionic substance comprising an anion $ClO_3^-$ and one or more inorganic cations, wherein the inorganic cations are selected such that the substance is, in aggregate, neutral.

The term "exfoliated" means partially delaminated, fully delaminated and, preferably, mixtures thereof, For example, a graphene may be prepared by fully delaminating a graphite and a highly exfoliated graphite having a number average stacking of from >1 to 10 layers may be prepared by partially delaminating a graphite.

The term "exfoliated graphite" means any carbon material derived by exfoliating a graphite oxide or a graphite intercalation compound. The term "highly exfoliated graphite" means a carbon material derived by exfoliating a graphite oxide and having a BET surface area of from 200 m2/g to 1500 $m^2$/g.

The term "graphite" means a solid particle consisting essentially of crystalline carbon with a characteristic crystal structure as determined by X-ray diffraction.

The terms "graphite oxide" and "intercalated graphite oxide" are synonymous and mean a carbon material derived by oxidizing a graphite and comprising carbon atoms and oxygen atoms, wherein most, if not all, of the oxygen atoms are covalently bonded to some of the carbon atoms. Preferably, graphite oxide consists essentially of the elements carbon and oxygen. Separating (e.g., by filtration or centrifugation) the carbon material from a reaction mixture containing it gives a form of the "isolated graphite oxide." Preferably, the separated carbon material is further treated by washing it with a solvent, preferably water (e.g., tap, deionized, or distilled water), and drying the washed carbon material to give a washed and dried form of the isolated graphite oxide. In some embodiments, the graphite oxide further consists essentially of relatively small amounts (e.g., less than 5 wt %) of other inorganic species, which are believed to result from incomplete purification of the graphite oxide.

The term "headspace" means a volume defined in part by an interior surface of the reaction vessel and in part by exposed surfaces of liquids and/or solids contents of the reaction vessel. Preferably, the volume is disposed essentially above the exposed surfaces of the liquids and/or solids.

The term "nitric acid" means fuming $HNO_3$, concentrated $HNO_3$, or a mixture thereof. The "concentrated nitric acid" means a concentrated nitric mixture that formally consists essentially of $HNO_3$ and water, wherein the $HNO_3$ is at least 65 wt %, but 86 wt % or less, of the concentrated nitric acid mixture based on total weight of the concentrated nitric acid mixture. A "fuming nitric acid" means a fuming nitric mixture that contains more than 86 wt % of $HNO_3$, water, and optionally nitrogen dioxide ($NO_2$), based on total weight of the fuming nitric mixture.

Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

The term "reaction running time" means the time starting from when a first portion of the first amount of chlorate salt is added to produce the reaction mixture and ending at the time when the reaction mixture is quenched.

The term "reaction running temperature" means the degree of hotness or coldness, preferably expressed in degrees Celsius, of the reaction mixture during a time period that begins when a last portion of chlorate salt is added to the reaction mixture and ending when the reaction mixture is quenched. Temperature of the reaction mixture during addition of the chlorate salt may be the same or different than the reaction running temperature. In some embodiments, these temperatures are the same. In other embodiments, the temperature of the reaction mixture during addition of the chlorate salt is lower, typically for safety reasons, than the reaction running temperature.

The term "sulfuric acid" means fuming $H_2SO_4$, concentrated $H_2SO_4$, or a mixture thereof. A "concentrated sulfuric acid" means a concentrated sulfuric mixture that formally consists essentially of $H_2SO_4$ and water, wherein the $H_2SO_4$ is at least 90 wt % of the concentrated sulfuric mixture based on total weight of the concentrated sulfuric mixture. A "fuming sulfuric acid" means a fuming sulfuric mixture that formally consists essentially of sulfur trioxide ($SO_3$), $H_2SO_4$, and water, wherein preferably the $SO_3$ is up to 30 wt % of the fuming sulfuric mixture.

Chlorate Salt

Preferably, the chlorate salt is ammonium chlorate (i.e., $NH_4ClO_3$) or a salt of the formula $M(ClO_3)_x$, wherein M is a metal of any one of Groups 1 and 2 of the Periodic Table of the Elements, the metal being in a formal oxidation state of +1 or +2, and x is an integer of 1 or 2 and is selected such that $M(ClO_3)_x$ is, in aggregate, neutral. Preferably, the chlorate salt comprises potassium chlorate, lithium chlorate, calcium chloride, magnesium chlorate, barium chlorate, or sodium chlorate, more preferably solid potassium chlorate, and still more preferably aqueous sodium chlorate. In some embodiments, the chlorate salt is in a form of a solid powder. In other embodiments, the chlorate salt comprises an aqueous solution of the chlorate salt.

When the chlorate salt comprises aqueous sodium chlorate, preferably the aqueous sodium chlorate is at a concentration of at least 0.1 moles of sodium chlorate per liter of aqueous sodium chlorate, i.e., 0.1 molar (M). Also preferably, concentration of sodium chlorate in the aqueous sodium chlorate is up to a saturated solution, i.e., the concentration at saturation of sodium chlorate in water. In other embodiments, the sodium chlorate concentration is 8 molar or less. In some embodiments, the saturated aqueous sodium chlorate is a solution. In other embodiments, the saturated aqueous sodium chlorate further contains solid sodium chlorate. Solubility of sodium chlorate in water at 20° C. is 101 grams (g) sodium chlorate per 100 milliliters (mL) water. Weight percent is calculated by dividing weight of chlorate salt by (sum of weight of chlorate salt+weight of water). Thus at 20° C. and density of water of 1.00 g/mL, a saturated aqueous sodium chlorate solution will be 101 g/201 g or 50.3 weight percent.

Graphite Intercalation Compound

Examples of suitable graphite intercalation compounds are commercially available under the trade names GRAFGuard® 160-50N (from GRAFTech Inc., Advanced Energy Technologies Division, Parma, Ohio) and HP-50 (from HP Material Solutions, Northridge, Calif.).

Graphite

Preferably, graphite is in powder form or flake form or mixtures thereof. Examples of suitable starting graphites are commercially available under the trade names Asbury 3775 (Asbury Graphite Mills Inc.) and TIMREX® GA96/10 (Timcal Graphite and Carbon, Inc.).

Preferably, the graphite consists essentially of particles having sizes characterized as being −10 mesh number (or, simply, −10 mesh) or a higher mesh number (e.g., −100 mesh graphite), wherein the "−" designation before the mesh number indicates particles pass through a sieve having the mesh number. A −10 mesh graphite means graphite that can pass through a −10 mesh screen. More preferably, the graphite consists essentially of particles having sizes characterized as being about −100 mesh or a higher mesh number, still more preferably about −300 mesh or a higher mesh number. Even more preferred is about −325 mesh graphite (i.e., particles will be about 44 μm or smaller). Particle size and mesh number are inversely related. Although fine graphite is preferable, coarse graphite may also be used, but it is preferable to adjust the concentration of the sulfuric acid and nitric acid so that an excess of nitronium ion does not result in the consumption of chlorate salts.

Nitric Acid

In some embodiments, the nitric acid used in the oxidation reaction of the present invention is the concentrated nitric acid. In other embodiments, the nitric acid is the fuming nitric acid. In still other embodiments, the nitric acid is the mixture of concentrated and fuming nitric acids. Preferably, the concentrated nitric acid formally contains from about 50 wt % to 86 wt % $HNO_3$, more preferably from about 60 wt % to about 70 wt % $HNO_3$, and still more preferably from about 65 wt % to about 70 wt % $HNO_3$, based on total weight of the concentrated nitric mixture.

Purge Gas

Preferably, the purge gas is non-reactive. Preferred non-reactive purge gases are argon gas and helium gas. More preferably, the purge gas is nitrogen gas, and still more preferably air.

Sulfuric Acid

In some embodiments, the sulfuric acid used in the oxidation reaction of the present invention is the concentrated sulfuric acid. In other embodiments, the sulfuric acid is the fuming sulfuric acid. In still other embodiments, the sulfuric acid is the mixture of concentrated and fuming sulfuric acids. Preferably, the concentrated sulfuric acid formally contains from about 90 wt % to about 98 wt % $H_2SO_4$, more preferably from about 95 wt % to about 98 wt % $H_2SO_4$, based on total weight of the concentrated sulfuric mixture. Preferably, the fuming sulfuric acid formally contains from about 20 wt % to about 65 wt % of $SO_3$ based on total weight of the fuming sulfuric mixture.

Process of Oxidizing Graphite to Graphite Oxide

The starting materials comprising the reaction mixture (i.e., a sulfuric acid, a nitric acid, water, a graphite, and a chlorate salt) are commercially available from a variety of vendors. The present invention also contemplates using one or more starting materials that are not obtained from a commercial vendor.

The present invention contemplates forming the reaction mixture in a variety of ways. Preferably, the reaction mixture is formed by steps of: (i) premixing the sulfuric acid, nitric acid, and a graphite together to give a first sulfuric acid/nitric acid/graphite mixture; and (ii) adding the chlorate salt to the sulfuric acid/nitric acid/graphite mixture to give the reaction mixture. More preferably, the reaction mixture is formed by steps of: (i) premixing the sulfuric acid and nitric acid together to give a sulfuric acid/nitric acid mixture; (ii) adding a graphite to the sulfuric acid/nitric acid mixture to give a second sulfuric acid/nitric acid/graphite mixture; and (iii) adding a chlorate salt to the second sulfuric acid/nitric acid/graphite mixture to give the reaction mixture.

In some embodiments, the present invention contemplates using less than a standard weight ratio of a chlorate salt to graphite, wherein a standard weight ratio of chlorate salt to graphite is 11 grams (0.090 mole) of $KClO_3$ per 1.0 gram of graphite, or the mole equivalent of $ClO_3^-$ if other chlorate salts are employed. In such embodiments, preferably, the weight ratio of potassium chlorate or solid sodium chlorate to graphite is greater than 2:1 but less than 8:1. More preferably the weight ratio is at least 3:1, and still more preferably at least 4:1, and is more preferably 7:1 or less, and still more preferably 6:1 or less. It is particularly preferred that the weight ratio of potassium chlorate or solid sodium chlorate to graphite be at least 4:1 and no more than 6:1.

In other embodiments, the sodium chlorate comprises aqueous sodium chlorate and the weight ratio of the sodium chlorate to the graphite is from 20:1 to 0.1:1.

In some embodiments, the present invention contemplates using different concentrations of the graphite in the reaction mixture. In such embodiments, concentration of graphite in the reaction mixture is preferably at least about 2 wt %, more preferably at least about 4 wt %, and preferably no more than about 15 wt %, more preferably no more than about 10 wt %, even more preferably no more than about 8 wt %, based on the total weight of the reaction mixture.

In some embodiments, the present invention contemplates using different concentrations of the sulfuric acid in the reaction mixture. In such embodiments, concentration of sulfuric acid in the reaction mixture can vary, but is preferably at least about 50 wt %, more preferably at least about 55 wt %, and preferably is no more than 70 wt %, more preferably no more than about 65 wt %, based on the total weight of the reaction mixture.

In some embodiments, the present invention contemplates using different concentrations of the nitric acid in the reaction mixture. In such embodiments, concentration of nitric acid in the reaction mixture is preferably at least about 17 wt %, more preferably at least about 23 wt %, and is preferably no more than about 35 wt %, and more preferably no more than about 30 wt %, based on the total weight of the reaction mixture.

In some embodiments, the present invention contemplates running reactions at different temperatures of the reaction mixture. In such embodiments, the reaction is preferably run at a reaction running temperature of the reaction mixture of 0° C. or higher, more preferably 20° C. or higher, still more preferably 26° C. or higher, and even more preferably 31° C. or higher. Also preferably, the reaction running temperature of the reaction mixture is maintained at about 55° C. or lower. When the chlorate salt is solid sodium chlorate, preferably the reaction running temperature of the reaction mixture preferably is 40° C. or higher and 100° C. or lower, more preferably about 55° C. or lower.

There is no particular limitation on reaction time, i.e., how long the reaction should be allowed to run starting when addition of the chlorate salt begins. Preferably, the reaction is quenched within 30 hours of reaction time, more preferably within 24 hours of reaction time, and still more preferably within 6 hours of reaction time. In many cases, extensive oxidation has already taken place within the first 4 hours of the reaction time. Highly exfoliated graphite having BET surface areas of 400 $m^2/g$ to 500 $m^2/g$ can be obtained by exfoliating graphite oxide produced within about 4 hours of reaction time.

Preferably after a suitable reaction time under the circumstances has been realized, the reaction is quenched, for example, by adding the reaction mixture to an excess of deionized water, with stirring. The resulting graphite oxide product may then be isolated by, for example, filtration, centrifugation, or decantation, with filtration being preferred. The filtered graphite oxide product may be washed with additional deionized water, and then dried, for example, at between about 60° C. and 80° C. overnight.

The present invention contemplates forming the reaction mixture in a variety of ways. In some embodiments, the process of the first embodiment is a continuous process (i.e., uninterrupted input of starting materials producing a flowing reaction mixture) or, more preferably, a batch process (i.e., input of fixed quantities of starting materials producing a separate unique reaction mixture). The batch process includes laboratory and manufacturing scale processes.

Preferably, the batch process reaction mixture is formed by steps of: (i) premixing the sulfuric acid, nitric acid, and a graphite together to give a first sulfuric acid/nitric acid/graphite mixture; and (ii) adding the chlorate salt to the sulfuric acid/nitric acid/graphite mixture to give the reaction mixture. More preferably, the reaction mixture is formed by steps of: (i) premixing the sulfuric acid and nitric acid together to give a sulfuric acid/nitric acid mixture; (ii) adding a graphite to the sulfuric acid/nitric acid mixture to give a second sulfuric acid/nitric acid/graphite mixture; and (iii) adding a chlorate salt to the second sulfuric acid/nitric acid/graphite mixture to give the reaction mixture.

In a typical batch process according to the present invention, the sulfuric acid and nitric acid are preferably first mixed together before addition of the other starting materials. The amounts of sulfuric acid and nitric acid are as discussed above. Following mixing of the sulfuric acid and nitric acid, sufficient time is allowed for the formation of the nitronium ion, for instance from 3 minutes to 4 hours. Then, the graphite is added to the sulfuric acid/nitric acid mixture, preferably with stirring until the graphite is essentially uniformly distributed to give a sulfuric acid/graphite mixture/inorganic nitrate salt mixture. This allows the formation of the graphite-nitronium intermediate. The chlorate salt is then added, either in portions or all at once to the sulfuric acid/inorganic nitrate salt/graphite mixture, with addition in portions being preferred. Following addition of the chlorate salt, the resulting reaction mixture is allowed to stir until the desired amount of graphite oxide is formed.

Preferably, the chlorate salt is added slowly so that $ClO_2$ gas production/evolution can be controlled and the amount of chlorate salt can be substantially minimized under the circumstances. Also preferably, the process of the first embodiment further comprises, in addition to the purging step, steps of: real-time monitoring of concentration of the $ClO_2$ gas in the headspace of the reaction vessel and adjusting the flow rate of the purge gas so that the concentration of the $ClO_2$ gas in the headspace of the reaction vessel is less than 10%, and still more preferably less than 3%. In some embodiments, the purge gas flows intermittently (e.g., pulsed; i.e., not continuously). Preferably, the purge gas flows continuously, albeit at varying flow rates as may be desirable under the circumstances (e.g., concentration of the $ClO_2$ gas in the headspace of the reaction vessel). Preferred real-time monitoring of concentration of the $ClO_2$ gas in the headspace of the reaction vessel is by infrared (IR), ultraviolet, visible, or Raman spectroscopy, more preferably Raman spectroscopy, and still more preferably ultraviolet-visible spectroscopy. The purging step facilitates mass transfer of at least some of the $ClO_2$ gas in the headspace out of the reaction vessel and, more preferably, to a $ClO_2$ gas scrubber. The $ClO_2$ gas scrubber contains an excess amount of a scrubbing agent reactive with $ClO_2$, wherein the scrubbing agent reactive with $ClO_2$ is, for example, sodium thiosulfate ($Na_2S_2O_3$). An example of a preferred $ClO_2$ gas scrubber is a commercial trickle bed scrubber such as a TRI-MER® packed bed tower scrubber (Tri-Mer Corporation, Owosso, Mich., USA). Preferably, a concentrated nitric acid is not used as a starting material in the present invention process and consequently the purged gas outlet does not contain a material amount (a quantity sufficient to reduce purge gas flow by 5% or more at a purge gas flow rate of 100 milliliters per minute (mL/min) of, and preferably contains essentially no, nitric acid vapors, and thus mass transfer of the $ClO_2$ gas from the headspace out of the reaction vessel is not materially inhibited by a nitric acid condensate.

There is no particular limitation on reaction time, i.e., how long the reaction should be allowed to run starting when addition of the chlorate salt begins. Preferably, the reaction is quenched within 30 hours of reaction time, more preferably within 24 hours of reaction time, and still more preferably within 6 hours of reaction time. In many cases, extensive oxidation has already taken place within the first 4 hours of the reaction time. Highly exfoliated graphite having BET surface areas of 400 $m^2/g$ to 800 $m^2/g$ can be obtained by exfoliating graphite oxide produced within about 4 hours of reaction time.

Preferably after a suitable reaction time under the circumstances has been realized, the reaction is quenched, for example, by adding the reaction mixture to an excess of deionized water, with stirring. The resulting graphite oxide product may then be isolated by, for example, filtration, centrifugation, or decantation, with filtration being preferred. The filtered graphite oxide product may be washed with additional deionized water, and then dried, for example, at between about 60° C. and 80° C. overnight.

In some embodiments, mixing of sulfuric acid and nitric acid results in formation of nitronium ion ($NO_2^+$) or mixing of sulfuric acid, nitric acid, and graphite results in formation of a nitronium ion-graphite complex or both nitronium ion-graphite complex and nitronium ion ($NO_2^+$). Preferably, the presence of the starting materials, nitronium ion, or a nitronium ion-graphite complex is monitored in the reaction mixture during the reaction (i.e., in real-time), more preferably monitored by Raman spectroscopy.

Another embodiment of the present invention concerns the real-time monitoring, in the graphite oxide formation process, of at least one of the starting materials, nitronium ion, a nitronium ion-graphite complex, and graphite oxide product. Such monitoring is particularly desirable in large-scale commercial processes, where real-time adjustments to the reaction, such as adjusting quantities of the starting materials, rates of addition of chlorate salt, reaction conditions such as cooling rate or cooling bath temperature, or a combination of two or more thereof may be made to attempt to maximize formation of graphite oxide product having a desirable characteristic (e.g., a graphite oxide suitable for producing a highly exfoliated graphite having a particular BET surface area) and reduce the potential for hazardous or explosive conditions. In addition, the monitoring allows control, by adjusting chlorate salt addition rate, of the concentration of the nitronium ion which, as discussed above, forms with the graphite particle an intermediate nitronium ion-graphite complex. As noted, excess formation of nitronium ion is preferably limited, in order to avoid consumption of expensive chlorate salts.

Raman spectroscopy is a particularly well-suited technique for the real-time monitoring of the graphite oxide manufacture process. Using Raman spectroscopy, it is possible to monitor the starting materials, including the chlorate and the nitronium ion formed by the sulfuric acid/nitric acid, as well as the observed nitronium ion-graphite intermediate complex. Alternatively, the formation of graphite oxide product can be monitored by ultraviolet-visible spectroscopy. Thus, the nitric acid and sulfuric acid may be used in relative ratios thereof needed to provide optimal concentration of nitronium ion-graphite complex by monitoring reactions in real-time with Raman spectroscopy and adjusting relative amounts of the nitric acid and sulfuric acid if needed.

Nitronium ion, formed by the mixing of sulfuric acid and nitric acid, can be observed in Raman spectroscopy as a band at about 1396 reciprocal centimeters ($cm^{-1}$). Without wishing to be bound by any particular theory, it is believed that upon addition of the graphite to the sulfuric acid/nitric acid mixture formed in a process of the present invention, the nitronium ion reacts with the graphite particles to form the nitronium ion-graphite complex. The nitronium ion-graphite complex is observed in Raman as a band at about 1629 $cm^{-1}$. Potassium chlorate can be observed as a band at about 940 $cm^{-1}$. Carbons with $sp^3$ hybridization, representing the graphite oxide, are observed as a band at about 1360 $cm^{-1}$.

In preferred embodiments of the present invention, the amounts of the starting materials are selected such that the concentration of excess nitronium ion in the reaction mixture is essentially minimized throughout the reaction. Thus in some embodiments, the first amount of the chlorate salt is added at a monitored rate so as to essentially minimize the concentration of excess nitronium ion in the reaction mixture as measured by Raman spectroscopy. The concentration of nitronium is essentially minimized through the monitoring of the reaction by the use of appropriate amounts of starting materials and timing of their additions as described above. By essentially minimizing the concentration of excess nitronium, it has been found that an isolated graphite oxide useful for producing an exfoliated graphite having a higher BET surface area can be obtained. Preferably, the first amount of the chlorate salt is selected such that no nitronium ion-graphite complex is detectable in the reaction mixture by Raman spectroscopy after addition of the first amount of the chlorate salt is complete. When nitronium ion-graphite complex is detectable in the reaction mixture by Raman spectroscopy after addition of the first amount of the chlorate salt is complete, then preferably one or more second amounts of chlorate salt are added until nitronium ion-graphite complex is no longer observed by Raman spectroscopy, wherein each second amount may be the same or different. Preferably, each second amount of the chlorate salt is less than the first amount of the chlorate salt.

Process of Exfoliating Graphite Oxide to Make an Exfoliated Graphite

In some embodiments, the process of the first embodiment further comprises a step of: subjecting the isolated graphite oxide to an exfoliation step to produce an exfoliated graphite, more preferably a highly exfoliated graphite. The highly exfoliated graphite is characterized as having a BET surface area of from 200 $m^2/g$ to about 1500 $m^2/g$. Preferably, the highly exfoliated graphite has a BET surface area of 500 m2/g or higher, more preferably more than 600 $m^2/g$, still more preferably 700 $m^2/g$ or higher, even more preferably 800 $m^2/g$ or higher. While higher BET surface areas are usually preferred, in some embodiments of the present invention, the highly exfoliated graphite has a BET surface area of 1400 $m^2/g$ or lower, in other embodiments, 1200 $m^2/g$ or lower, and in still other embodiments 1000 $m^2/g$ or lower.

The present invention contemplates forming highly exfoliated graphite from the graphite oxide by any of a variety of processes, including solution processes, sonication, or thermal processes. Preferred is thermal exfoliation at a temperature of from about 250° C. to about 2000° C., more preferably at a temperature of from about 500° C. to about 1500° C., still more preferably at a temperature of about 1000° C. Thermal exfoliation is done under a substantially inert atmosphere, e.g., under an atmosphere consisting essentially of nitrogen, helium, argon, or a mixture thereof. In a typical procedure, details of which are described later, the graphite oxide prepared as described above is placed in a quartz boat or other container suitable for high temperature conditions, and then the graphite oxide in the container is placed into a heated furnace under inert atmosphere, preferably anhydrous nitrogen, at high temperature for a short time, such as at about 1000° C. for 30 seconds. The container and resulting highly exfoliated graphite product are then withdrawn from the furnace and allowed to cool. Prior to use, the highly exfoliated graphite (typically fluffy black) may be comminuted in a blender or other homogenizer. Optionally, the highly exfoliated graphite may also be compacted lightly by applying moderate pressure to an amount thereof placed in a deformable space or container such as a vacuum bag or a metal die, respectively.

The exfoliated graphite, including highly exfoliated graphite, is useful as a filler in graphite polymer composites such as, for example, graphite ethylene vinyl acetate copolymer composites. The graphite polymer composites are useful materials for preparing, for example, molded articles such as interior automobile parts.

The following examples are illustrative of the present invention but are not intended to limit its scope.

Raman Spectroscopy

Raman spectra are collected using visible excitation at 532 nanometers (nm) and the spectrometer interfaced to a fiber optic probe. The tip of the probe is mounted on a portable probe stand and placed immediately outside a tube containing the starting materials. The probe is configured for 180 degree backscatter collection. The Raman spectrometer system is configured as follows:

Coherent 532 nm diode-pumped Nd/YAG laser—with doubling crystal;
Kaiser Holospec grating spectrograph;
532 nm Holoplex grating, filters, probe head;
4.5 mm focal length objective, Mark II probe, multimode fibers: 50 micrometer (μm) core excitation, 100 μm core collection.

While the above instrument configuration is used in the examples, there are many other configurations which can be used for this purpose and which provide analogous results.

Raman Band Assignments. Raman bands and their assignments are provided in Table 1. In Table 1, con means concentrated and $cm^{-1}$ means reciprocal centimeters.

TABLE 1

Assignments of vibrational bands

| Band ($cm^{-1}$) | Assignment |
|---|---|
| 435 | con sulfuric acid |
| 495 | con nitric acid |
| 575 | con sulfuric acid |
| 650 | con nitric acid |
| 687 | con nitric acid |
| 910 | con sulfuric acid |
| 940 | chlorate |
| 1040 | Reference (both acids) |
| 1180 | con sulfuric acid |
| 1309 | con nitric acid |
| 1360 | $sp^3$ carbon |
| 1395 | nitronium |
| 1550 | con nitric acid |
| 1555-1625 | $sp^2$ carbon |
| 1630 | Nitronium ion-graphite complex |
| 1670 | con nitric acid |

Illustrative Invention Procedure (A)

Making Graphite Oxide

This procedure illustrates the process for preparing a graphite oxide while purging chlorine dioxide of the present invention. This procedure is performed in a fume hood with good ventilation. The efficiency of the hood is checked before each reaction and filtration. This reaction utilizes a powerful oxidizer ($KClO_3$), concentrated sulfuric acid, and concentrated nitric acid and generates a toxic and explosive intermediate ($ClO_2$ gas).

Amounts of materials: 10 gram (g) of −325 mesh graphite powder or flake; from 55 g to 110 g of solid $KClO_3$ (see Table 2 later for actual amounts of $KClO_3$ for the Comparative Examples and Examples); 175 milliliters (mL) of concentrated (98 wt %) $H_2SO_4$; and 90 mL of concentrated (70 wt %) nitric acid.

Reaction vessel (a cylindrical tube reactor) and scrubber set-up: Perform the reaction in a heavy-walled, 1000 mL-volume glass kettle reaction vessel disposed in an ice-water bath. Cover the kettle reaction vessel with a loose-fitting Teflon lid defining 4 apertures therethrough. Through one aperture dispose a thermocouple probe disposed inside a glass well filled partially (i.e., to 2.5 centimeters depth) with water, the thermocouple probe having a distal end submersible in the water in the glass well, the glass well having a distal end submersible in a reaction mixture to monitor temperature of the reaction mixture. Through another aperture dispose a stir shaft having a distal end outfitted with a polytetrafluoroethylene stir paddle. Through a third aperture dispose a tubular lower portion of a motor-driven powder addition funnel used for controlled addition of potassium chlorate to the reaction mixture. Through the remaining aperture dispose a purge device with an inner-tubular lower portion being surrounded by a spaced-apart outer-tubular upper portion defining a purge gas inlet in fluid communication with a source of nitrogen gas. The inner-tubular lower portion having a distal end disposed above any reaction mixture and a proximal end that is in sequential fluid communication, via polytetrafluoroethylene tubing, with first and second $ClO_2$ gas scrubbers, a drying tube, a gas flow meter, a vacuum manifold, and a water aspirator, wherein the first and second $ClO_2$ gas scrubbers, drying tube, gas flow meter, and vacuum manifold each have disposed therein a gas inlet and a gas outlet. Dispose aqueous solutions of $Na_2S_2O_3$ (200 millimoles and 500 millimoles, respectively) a buffering agent that is sodium dihydrogen phosphate ($NaH_2PO_4$), and an indicator that is sodium iodide (NaI) in the first and second $ClO_2$ gas scrubbers. Dispose a drying agent, solid calcium sulfate, in the drying tube. An optional fifth aperture may be employed for purposes of drawing and returning a sample from the headspace for spectroscopic determination of $ClO_2$ concentration therein.

Premixing steps: Mix with stirring (stir shaft at a stirring rate of 150 revolutions per minute (rpm)) the concentrated sulfuric acid and concentrated nitric acid. Insert the distal end of the thermocouple probe/glass well into the sulfuric acid/nitric acid mixture. Cool the sulfuric acid/nitric acid mixture to a temperature of 2° C. Add the 10 g of −325 mesh graphite via a simple (i.e., not motorized) glass powder funnel to the sulfuric acid/nitric acid mixture, and stir to give a sulfuric acid/nitric acid/graphite mixture at a starting temperature of 2° C.

Chlorate salt addition step (time: about 1 hour): Sieve the $KClO_3$ through a 500 μm screen (ASTM −35 mesh) and add it to the motor-driven powder addition funnel. Start a nitrogen gas purge flow in through purge gas inlet and adjust flow rate of purged gas through the scrubbers to 2000 mL of nitrogen gas per minute (mL/min) using vacuum to draw the reaction gases out of the reaction vessel and into the scrubber. Start the motor of the motor-driven powder addition funnel so as to add the $KClO_3$ slowly over about 60 minutes being careful not to exceed a temperature rise of more than 5° C. by adjusting the addition rate of the $KClO_3$. Observe formation of a yellow-colored gas in headspace of the kettle reaction vessel. Monitor temperature and be especially careful to not allow excessive amounts of the $KClO_3$ to fall too quickly into the resulting reaction mixture.

Allowing reaction to run: After all of the $KClO_3$ has been added, cool or warm, as the case may be, the reaction mixture to a reaction running temperature of from 0° C. to 24.5° C. (see Table 2 later for actual reaction running temperatures for the Comparative Examples and Examples) and continue purging, scrubbing, and stirring. Remove an aliquot at 3 hours reaction time and quench it using a procedure analogous to the quenching procedure described below. Quench the remaining reaction mixture after a total reaction time of 24 hours.

Quenching the reaction: Quench the reaction by adding the reaction mixture to a 4 liter (L) beaker containing 2 L of deionized water, further rinsing the reaction vessel with additional deionized water and adding the rinses to the beaker, which brings the total quench volume to about 3 L. Stir for 10 minutes. Filter (or centrifuge) the quenched mixture, and wash the resulting filtercake with 3 L of additional deionized water to give brown filter cake. Dry in a laboratory oven (80° C.) until a constant weight is obtained to give a black-colored, isolated graphite oxide.

Illustrative Invention Procedure (B)

Making Highly Exfoliated Graphite

This procedure illustrates the process of the present invention for preparing an exfoliated graphite from a graphite oxide prepared by the process of the first embodiment. Separately grind the dried graphite oxide of the 3 hour aliquot quench and the isolated graphite oxide of Illustrative Invention Procedure (A) in a grinder for 90 seconds to give fine powders. Add a from 0.1 g to 0.3 g portion of the fine powder to a quartz boat equipped with a quartz loop on an end and covered with a tight-fitting, fine-mesh stainless steel screen. Conduct the following under a high purity anhydrous nitrogen gas atmosphere/purge. Preheat a tube furnace fitted with a quartz pyrolysis/muffle tube to a desired setpoint, typically 950° C. Preheat the quartz boat and a portion of the fine graphite oxide powder at entrance of the furnace tube for 1 minute to remove air and moisture from the fine powder, and then insert the quartz boat and the portion of preheated fine graphite oxide powder into the center of the quartz pyrolysis tube for heating 30 seconds at 950° C. Draw the quartz boat back and allow the resulting material to cool for 1 minute at the entrance of the furnace tube, and then remove it completely from the tube and allow it to cool to room temperature to give highly exfoliated graphite of the three hour aliquot and highly exfoliated graphite of the Illustrative Invention Procedure (B). Weigh the highly exfoliated graphite and determine its BET surface area as described previously herein.

COMPARATIVE (NON-INVENTION) EXAMPLES

Comparative Examples A1, B1, and C1

Preparing Graphite Oxides

Repeat the procedure of Illustrative Invention Procedure (A) three times using 110 g, 55 g, or 55 g, respectively, of solid $KClO_3$; stirring rates of 150 rpm, 250 rpm, or 100 rpm, respectively; and each using a reaction running temperature of 0° C., except do not use the nitrogen gas purge and the scrubbers, to give isolated graphite oxides of Comparative Examples A1, B1, and C1. The preparation conditions are reported later in Table 2.

Comparative Examples A1, B1, and C1

Preparing Highly Exfoliated Graphite

Repeat the procedure of Illustrative Invention Procedure (B) three times using the isolated graphite oxides of Comparative Examples A1, B1, and C1 instead of Illustrative Invention Procedure (A). The results are reported later in Table 2.

EXAMPLES OF THE PRESENT INVENTION

Examples 1a to 18a

Repeat the procedure of Illustrative Invention Procedure (A) 18 times using 110 g, 55 g, 82.5 g, or 66 g of solid $KClO_3$ as indicated later in Table 2; a stirring rate of 150 rpm; and a reaction running temperature of 0° C., 0.5 C, 6.5 C, 12.5 C, 18.5 C, or 24.5 C as indicated later in Table 2; to give isolated graphite oxides of Examples 1a to 18a. The preparation conditions are reported later in Table 2.

Examples 1b to 18b

Repeat the procedure of Illustrative Invention Procedure (B) 18 times using the isolated graphite oxides of Examples 1a to 18a instead of Illustrative Invention Procedure (A). The results are reported later in Table 2.

TABLE 2

| Isolated graphite oxide (Comparative) Example number | Weight of $KClO_3$ (grams) | Reaction running temperature (° C.) | Highly Exfoliated graphite (Comparative) Example number | BET surface area ($m^2/g$) of the highly exfoliated graphite 3 hours Aliquot | BET surface area ($m^2/g$) of the highly exfoliated graphite 24 hours | Nitrogen Gas Purge? (Yes/No) |
|---|---|---|---|---|---|---|
| (A1) | 110 | 0 | (A2) | 518 | 708 | No |
| (B1) | 55 | 0 | (B2) | 302 | 363 | No |
| (C1) | 55 | 0 | (C2) | 212 | 486 | No |
| 1a | 110 | 0 | 1b | 514 | 744 | Yes |
| 2a | 110 | 0 | 2b | 558 | 811 | Yes |
| 3a | 55 | 0 | 3b | 213 | 223 | Yes |
| 4a | 82.5 | 0 | 4b | 449 | 575 | Yes |
| 5a | 82.5 | 0.5 | 5b | 398 | 572 | Yes |
| 6a | 82.5 | 0.5 | 6b | 430 | 525 | Yes |
| 7a | 82.5 | 6.5 | 7b | 450 | 523 | Yes |
| 8a | 82.5 | 12.5 | 8b | 505 | 614 | Yes |
| 9a | 82.5 | 18.5 | 9b | 524 | 494 | Yes |
| 10a | 82.5 | 24.5 | 10b | 566 | 709 | Yes |

TABLE 2-continued

| Isolated graphite oxide (Comparative) Example number | Weight of KClO$_3$ (grams) | Reaction running temperature (° C.) | Highly Exfoliated graphite (Comparative) Example number | BET surface area (m$^2$/g) of the highly exfoliated graphite 3 hours Aliquot | BET surface area (m$^2$/g) of the highly exfoliated graphite 24 hours | Nitrogen Gas Purge? (Yes/No) |
|---|---|---|---|---|---|---|
| 11a | 66 | 24.5 | 11b | 490 | 560 | Yes |
| 12a | 55 | 24.5 | 12b | 519 | 503 | Yes |
| 13a | 66 | 24.5 | 13b | 565 | 554 | Yes |
| 14a | 66 | 24.5 | 14b | 617 | 644 | Yes |
| 15a | 66 | 24.5 | 15b | 616 | 634 | Yes |
| 16a | 66 | 24.5 | 16b | 438 | 577 | Yes |
| 17a | 66 | 24.5 | 17b | 584 | 477 | Yes |
| 18a | 66 | 24.5 | 18b | 565 | 566 | Yes |

As shown in Table 2, exfoliated graphite of Example 12b has BET surface areas of 519 m$^2$/g at 3 hours and 503 m$^2$/g at 24 hours made from the isolated graphite oxide of Example 12a prepared at the reaction running temperature of 24.5° C., and such BET surface areas are higher than the BET surface areas of 213 m$^2$/g at 3 hours and 223 m$^2$/g at 24 hours for the exfoliated graphite of Example 3b made from the isolated graphite oxide of Example 3a prepared at the reaction running temperature of 0° C. Such data indicate quality of the isolated graphite oxide product improves when prepared at a higher reaction running temperature.

Also as shown in Table 2, exfoliated graphite of Comparative Example B2 has BET surface areas of 302 m$^2$/g at 3 hours and 363 m$^2$/g at 24 hours made from the isolated graphite oxide of Comparative Example B1 prepared at the reaction running temperature of 0° C., and such BET surface areas are higher than the BET surface areas of 213 m$^2$/g at 3 hours and 223 m$^2$/g at 24 hours for the exfoliated graphite of Example 3b made from the isolated graphite oxide of Example 3a also prepared at the reaction running temperature of 0° C. Such data indicate quality of the isolated graphite oxide product decreases when purging with a purge gas and at a same reaction running temperature. The data also indicate that ClO$_2$ gas generated during the reaction participate in oxidizing the graphite. Thus all other circumstances being equal, purging with the purge gas to remove the ClO$_2$ gas from headspace in the reaction vessel during a reaction reduces quality of the resulting graphite oxide. As seen below, however, the negative effect of purging with the purge gas is more than overcome by raising reaction running temperature of the reaction mixture.

Further as shown in Table 2, exfoliated graphite of Example 12b has BET surface areas of 519 m$^2$/g at 3 hours and 503 m$^2$/g at 24 hours made from the isolated graphite oxide of Example 12a prepared at the reaction running temperature of 24.5° C., and such BET surface areas are significantly higher than the BET surface areas of 302 m$^2$/g at 3 hours and 363 m$^2$/g at 24 hours made from the isolated graphite oxide of Comparative Example B1 prepared at the reaction running temperature of 0° C. Thus, any negative effect of purging with the purge gas in Example 12a, versus not purging in Comparative Example B1, is more than overcome by raising the reaction running temperature of the reaction mixture in Example 12a to 24.5° C. compared to the reaction running temperature of 0° C. in Comparative Example B1.

Still further, the BET surface area of the exfoliated graphite of the 3 hour and 24 hour aliquots of Example 10b is higher than the BET surface area of the 3 hour and 24 hour exfoliated graphites of Example 6b. Accordingly, raising reaction running temperature significantly increases rate of oxidation of graphite.

As shown by the Examples, higher reaction running temperatures promote faster oxidation of graphite to graphite oxide and overcome any negative effects on quality of the graphite oxide product resulting from purging with a purge gas to purge ClO$_2$ gas from headspace of the reaction vessel. Thus, the process of the first embodiment provides a higher temperature, faster, and safer method of making graphite oxide by oxidizing a graphite with a chlorate salt.

While the present invention has been described above according to its preferred embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A process for preparing a graphite oxide while purging chlorine dioxide, the process comprising steps of:
   (a) providing an adjustable-flow source of purge gas and a reaction vessel defining a purge gas inlet and a purged gas outlet, wherein the reaction vessel contains a headspace and a reaction mixture comprising the following starting materials: a sulfuric acid, a nitric acid, a first amount of aqueous sodium chlorate, and graphite, wherein the reaction mixture is in fluid communication with the headspace of the reaction vessel and the adjustable-flow source of purge gas is in sequential fluid communication with the purge gas inlet, headspace, and purged gas outlet of the reaction vessel;
   (b) allowing the reaction mixture to react, at a reaction running temperature of 0 degrees Celsius or higher and for a reaction running time of 30 hours or less, to form graphite oxide and chlorine dioxide gas, and some of the chlorine dioxide gas to migrate into the headspace of the reaction vessel;
   (c) purging with a purge gas at least some of the chlorine dioxide gas from the headspace and out of the reaction vessel via the purge gas outlet by sequentially flowing the purge gas at an adjustable flow rate from the adjustable-flow source of purge gas through the purge gas inlet, into the headspace of the reaction vessel, and out of the reaction vessel via the purged gas outlet; and (d) separating the graphite oxide from the reaction mixture to give an isolated graphite oxide;

the process further comprising a step of monitoring in real-time concentration of the chlorine dioxide gas in the headspace of the reaction vessel and adjusting the flow rate of the purge gas so that the concentration of the chlorine dioxide gas in the headspace of the reaction vessel is less than 10% during step (b).

2. The process as in claim 1, wherein the monitoring in real-time is performed by infrared spectroscopy, ultraviolet spectroscopy, or visible spectroscopy.

3. The process as in claim 1, wherein the monitoring in real-time is performed by Raman spectroscopy.

4. The process as in claim 1, the process further comprising forming the reaction mixture by steps of:
   (i) premixing in the reaction vessel the following starting materials: the sulfuric acid, the nitric acid, and the graphite to give a first sulfuric acid/nitric acid/graphite mixture; and
   (ii) adding the first amount of aqueous sodium chlorate to the first sulfuric acid/nitric acid/graphite mixture to give the reaction mixture.

5. The process as in claim 4, the process further comprising forming the reaction mixture by steps of:
   (i) premixing in the reaction vessel the following starting materials: the concentrated sulfuric acid and the nitric acid to give a sulfuric acid/nitric acid mixture;
   (ii) adding the graphite to the sulfuric acid/nitric acid mixture to give a second sulfuric acid/nitric acid/graphite mixture; and
   (iii) adding the first amount of the aqueous sodium chlorate to the second sulfuric acid/nitric acid/graphite mixture to give the reaction mixture.

6. The process as in claim 1, wherein presence of the starting materials, nitronium ion, or a nitronium-graphite complex is monitored in the reaction mixture during reaction by Raman spectroscopy.

7. The process as in claim 6, wherein the first amount of the aqueous sodium chlorate is added at a monitored rate so as to minimize the concentration of excess nitronium ion in the reaction as measured by Raman spectroscopy.

8. The process as in claim 7, wherein the first amount of the aqueous sodium chlorate is selected such that no nitronium-graphite complex is detectable in the reaction mixture by Raman spectroscopy after addition of the first amount of the chlorate salt is complete.

9. The process as in claim 1, wherein nitronium-graphite complex is detectable in the reaction mixture by Raman spectroscopy after addition of the first amount of the aqueous sodium chlorate is complete, and then one or more second amounts of aqueous sodium chlorate is added until nitronium-graphite complex is no longer observed by Raman spectroscopy, wherein each second amount may be the same or different.

10. The process as in claim 1, wherein the reaction running temperature of the reaction mixture is 20 degrees Celsius or higher.

11. The process as in claim 10, wherein the reaction running temperature of the reaction mixture is 55 degrees Celsius or lower.

12. The process as in claim 1, wherein the reaction running time is 4 hours or less.

13. The process as in claim 1, wherein the graphite consists essentially of particles having sizes characterized as being −10 mesh number or a higher mesh number, wherein the "−" designation before the mesh number indicates particles pass through a sieve having the mesh number.

14. The process as in claim 1, the process further comprising a step of subjecting the isolated graphite oxide to an exfoliation step to produce an exfoliated graphite.

15. The process as in claim 14, wherein the exfoliated graphite comprises a highly exfoliated graphite, which is characterized as having a Brunauer-Emmett-Teller surface area of from about 200 square meters per gram to about 1500 square meters per gram.

* * * * *